3,075,614
Patented Jan. 29, 1963

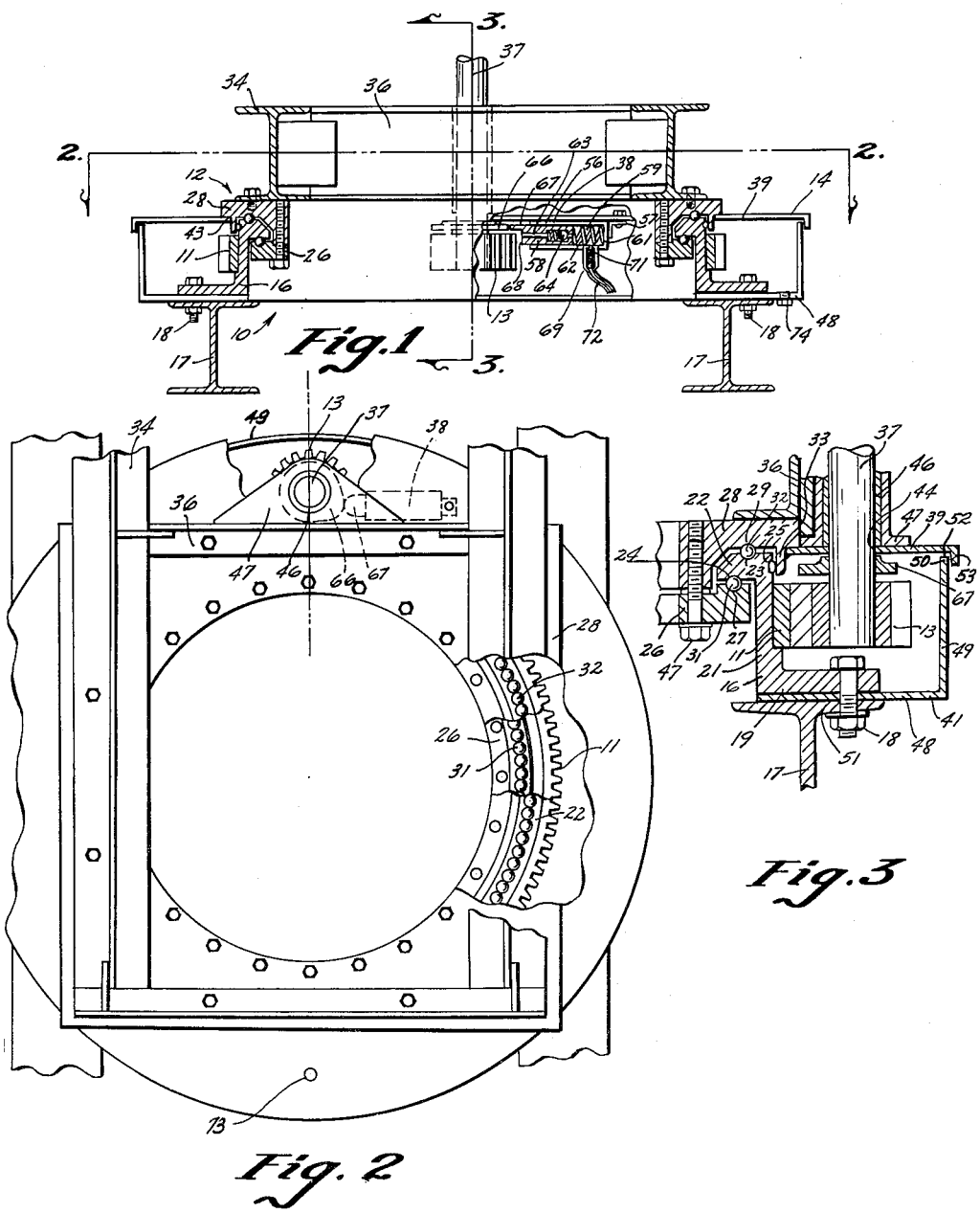

3,075,614
TURNTABLE STRUCTURE
John L. Grundon, E. 16th and Howard Drive,
Des Moines, Iowa
Filed Dec. 8, 1960, Ser. No. 74,617
2 Claims. (Cl. 184—6)

This invention relates generally to a turntable unit for a portable mechanical crane and in particular to the co-acting pinion and ring gears for a turntable unit.

An object of this invention is to provide an improved turntable unit where in the pinion and ring gears are protected from the weather, and foreign matter.

Another object of this invention is to provide a turntable unit in which a housing for the pinion and ring gears is partially filled with a lubricant to provide a constant lubricating bath for the gears.

A further object of this invention is the provision of a turntable unit which is economical to manufacture, easy to install and maintain, and wherein the movable parts are encased and constantly lubricated to provide a long service life with a minimum of servicing attention.

These objects and other features and advantages of this invention will become readily apparent upon reference to the following description and the accompanying drawing, wherein:

FIG. 1 is a fragmentary vertical transverse sectional view of the turntable unit of this invention, shown in assembly relation with a main frame and a rotatable frame and with certain parts broken away for clarity of illustration;

FIG. 2 is a sectional view taken along the line 2—2 in FIG. 1, with some parts broken away to more clearly show the construction of the turntable unit; and FIG. 3 is an enlarged vertical sectional view taken along the line 3—3 in FIG. 1.

Referring now to the drawing, a turntable unit is shown as including a stationary unit 10 (FIG. 1) having an externally toothed ring gear 11, a rotatable unit 12 having a pinion gear 13 in mesh with the ring gear 11, and a housing 14 covering both gears 11 and 13 and within which a fluid lubricant (not shown) for the gears is contained.

The stationary unit 10 includes an annular base member 16 mounted upon a pair of I-beams 17 and secured thereto by nut and bolt devices 18. The base member 16 has a lower horizontally disposed, outwardly extended peripheral flange 19 (FIG. 3), an upstanding wall 21 to which the ring gear 11 is secured, and an upper inwardly extended peripheral flange 22 having upper and lower raceways 23 and 24, respectively, formed therein. On the upper outer end of the wall 21, an O-ring seal 25 is mounted in a groove provided therefor for a purpose hereinafter described.

The rotatable unit 12 includes an annular lower ring 26 (FIG. 3) having a raceway 27 formed therein complementary with the raceway 24, and includes further an annular upper ring 28 having a raceway 29 which is complementary with the upper raceway 23 of the stationary flange 22. Ball bearings 31 and 32 are positioned within the complementary pairs of raceways 24—27 and 23—29, respectively, and the rings 26 and 28 are connected together for rotation about the stationary unit 10 by a plurality of bolts 47 inserted through aligned openings provided therefor in the two rings 26 and 28. A depending lip 33 (FIG. 3) is formed on the upper ring 28 so as to be in juxtaposition with the seal 25 for the purpose of preventing the escape at that location of the heavy grease used for lubricating the ball bearings, and also to prevent the entrance of foreign matter into the raceways.

On top of the upper ring 28, a rectangular frame having beams 34 and 36 (FIGS. 1 and 2) is provided for supporting the superstructure (not shown) of the crane, which includes a vertical shaft 37 driven during operation of a swing shaft assembly (not shown) and connected to the pinion gear 13. By virtue of the constant mesh of the pinion 13 with the ring gear 11, rotation of the shaft 37 causes the pinion to walk around the ring gear, thus resulting in a rotation of the rotatable unit 12 and all the assemblies mounted on it.

The housing 14 for the pinion 13 and ring gear 11 includes a pair of annular upper and lower plates 39 and 41 (FIGS. 1 and 3) secured, respectively, to the rotatable and stationary units 10 and 12. The upper plate 39 has its inner peripheral edge 43 welded to the underside of the upper ring 28, extends radially outwardly over and beyond both pinion and ring gears 13 and 11, and is provided at its outer peripheral edge with a depending lip 53. An opening 44 is formed in the upper plate 39 for insertion of the shaft 37, and a bushing 46 and a mounting bracket 47 (FIG. 2) are provided for supporting the shaft 37 on the rotatable unit 12.

The lower plate 41 of the housing 14 is right angular in cross section and has a lower horizontally disposed flange 48 (FIG. 3) and a vertical wall 49. The flange 48 extends parallel to the plate 39 and is secured between the base element flange 19 and the top 51 of each I-beam 17 by the nut and bolt devices 18. The wall 49 is disposed radially beyond the pinion and ring gears 13 and 11, respectively, with its upper edge 50 disposed adjacent the lip 53 in an overlapping manner. The top surface 52 of the wall 49 is contiguous with the underside of the outer peripheral edge of the upper plate 39, being however spaced therefrom sufficiently to allow movement of the plate 39 with the rotatable unit 12.

Thus, it may readily be seen that the plates 39 and 41 form with adjacent external parts of the stationary and rotatable units 10 and 12, such as the upper ring depending lip 33 and the outer side of the base element 16, a substantially fluid tight housing 14 about the gears 11 and 13 (FIG. 3), which housing 14 completely encircles the ring gear 11 (FIGS. 1 and 2). For easy installation of the housing 14 in the field, the lower plate flange 48 can be shortened for securement, as by butt welding or the like, to the base member flange 19 or to the upper flange of the I-beam 17, with the wall 49 remaining in the same location as illustrated in FIG. 3.

A pump 38 (FIGS. 1 and 2) may be provided to ensure a constant circulation of the lubricating fluid (not shown) contained in the housing. A cylinder 56 is included in the pump structure and is attached by a mounting bracket 57 or the like to the underside of the upper plate 39 (FIG. 1) adjacent the pinion 13. A piston or plunger 58 is movably inserted in the cylinder and is adapted for limited reciprocal movement therein whereby to form an expandible chamber 59 between the inner end of the plunger 58 and the closed end 61 of the housing 56, as determined by a coil spring 62.

Within the plunger 58, is an axial bore 63 formed of two portions, one of which is of a lesser diameter than the other. In the larger portion of the bore 63 adjacent the chamber 59, a conventional one-way check valve 64 comprised of a spring and a ball is arranged. This valve 64 permits the flow of fluid only from the chamber 59 through the bore 63 and outwardly from the plunger 58 against the pinion 13, when the plunger 58 is forced into the housing 56 against the bias of the spring 62. To provide for such plunger movement, a cam 66 (FIGS. 1 and 2) is mounted on the pinion shaft 37 within the housing 14 for coaction during rotation of the shaft 37 with a lip 67 extended from the upper part of the outer end 68 of the plunger 58, the lower part of the plunger end 68 thus being free and clear of the pinion 13.

Another one-way check valve 69 (FIG. 1) is attached to the housing 56 and is adapted to prevent fluid from passing outwardly through an opening 71 formed in a wall of the housing during the inward stroke or movement of the plunger 58. However, when the plunger is forced outwardly by the spring 62 so as to expand and create a subatmospheric condition in the chamber 59, the valve 69 is opened and fluid from the lubricant housing 14 is drawn through a tube 72 (FIG. 1), the valve 69, the opening 71 and into the chamber 59. The tube 72 is attached to the valve 69 and extends close to the bottom of the housing 14. This provides for a constant fluid recharging of the chamber 59.

In use, the housing 14 is partially filled through a filler opening 73 (FIG. 2) in the plate 39, a drain opening 74 provided in the lower plate flange 48. Upon rotation of the pinion shaft 37, the cam 66 engages and forces the plunger 58 backward or to the right as viewed in FIG. 1 into the chamber 59. This movement closes the inlet valve 69 and opens the outlet valve 64 so as to force lubricant contained in the chamber 59 out through the bore 63 and against the pinion 13.

After the high portion of the cam 66 has passed the plunger lip 67, the spring 62 recoils and forces the plunger 59 outwardly or to the left of the housing 56 and back to its normally extended position. This movement closes the valve outlet 64 and opens the inlet valve 69 so as to refill the chamber 59 with lubricant. It is appreciated that for every rotation of the pinion shaft 37 and the cam 66, a quantity of lubricant is emitted from the pump 38 under pressure and squirted upon the pinion 13 and the ring gear 11, thus resulting in a constant bathing of the two gears.

In summation, a housing 14 is provided for encasing the ring gear 11 and the pinion 13 for protection from the weather, and for providing a substantially fluid tight structure capable of containing a quantity of lubricant of sufficient quantity for constantly keeping the gear lubricated. Additionally, a reciprocating-type pump 38 may be associated with the housing 14 for constantly recirculating the lubricant from the housing and directly against the gears to provide a constant oil bath during rotation of the turntable unit.

Although a preferred embodiment of the invention has been disclosed herein, various modifications and alterations can be made thereto without departing from the full scope of the invention as defined in the appended claims.

I claim:

1. In a turntable unit having a stationary unit with a ring gear and a rotatable unit including a drive shaft having a pinion gear thereon in mesh with the ring gear, coacting means secured to said units and forming therewith a substantially fluid tight annular housing about the gears concentric with said ring gear and adapted to hold a quantity of fluid lubricant therein, pump means mounted on said rotatable unit for rotation therewith, an inlet for said pump means for withdrawing fluid lubricant from said housing, an outlet for said pump means arranged adjacent said pinion gear, and coacting means on said pump means and on said shaft for operating said pump in response to rotation of said shaft to eject fluid from said outlet directly against said pinion gear.

2. In a turntable unit having a ring gear and a pinion gear, a stationary unit having an annular vertical wall adapted to support the ring gear, a rotatable unit positioned contiguous with said vertical wall and supporting the pinion gear in mesh with the ring gear, an annular plate secured to the rotatable unit and extended radially therefrom sufficient to cover the gears, an annular right angular member having a horizontal flange secured to the stationary unit and extended radially therefrom beneath the gears, said member having a vertical flange radially beyond said gears extended to a position contiguous with said plate, said vertical wall, said plate, and said right angular member forming a substantially fluid tight housing about the gears adapted to hold a quantity of fluid therein for lubricating the gears.

References Cited in the file of this patent
UNITED STATES PATENTS

| | | |
|---|---|---|
| 2,481,416 | Grundon | Sept. 6, 1949 |
| 2,491,747 | Maier | Dec. 20, 1949 |
| 2,640,400 | Verderber | June 2, 1953 |